US007997829B2

United States Patent
Brown et al.

(10) Patent No.: US 7,997,829 B2
(45) Date of Patent: Aug. 16, 2011

(54) ARTICULATED FLOWLINE CONNECTION

(75) Inventors: Ricky C. Brown, Cat Spring, TX (US);
Arcandra Tahar, Houston, TX (US);
Djoni Eka Sidarta, Houston, TX (US);
Edward E. Horton, III, Houston, TX (US)

(73) Assignee: Horton Wison Deepwater, Inc., Houston, TX (US)

( * ) Notice: Subject to any disclaimer, the term of this patent is extended or adjusted under 35 U.S.C. 154(b) by 0 days.

(21) Appl. No.: 12/550,890

(22) Filed: Aug. 31, 2009

(65) Prior Publication Data
US 2010/0054862 A1   Mar. 4, 2010

Related U.S. Application Data

(60) Provisional application No. 61/093,342, filed on Aug. 31, 2008.

(51) Int. Cl.
*F16L 1/235* (2006.01)
(52) U.S. Cl. .................................. 405/184.4; 405/195.1
(58) Field of Classification Search ............... 405/184.4, 405/195.1, 154.1
See application file for complete search history.

(56) References Cited

U.S. PATENT DOCUMENTS

| 3,373,807 | A | * | 3/1968 | Fischer et al. | ............... 405/169 |
| 3,462,963 | A | * | 8/1969 | Moore | ........................... 405/164 |
| 4,140,292 | A | * | 2/1979 | Kaigler, Jr. | ..................... 248/49 |
| 2002/0167172 | A1 | | 11/2002 | Latham et al. | |

FOREIGN PATENT DOCUMENTS

| EP | 0031611 A2 | 7/1981 |
| WO | 9823845 A1 | 6/1998 |
| WO | 0005525 A2 | 2/2000 |

OTHER PUBLICATIONS

PCT/US2009/055514 International Search Report and Written Opinion, Feb. 2, 2010.

* cited by examiner

*Primary Examiner* — John Kreck
(74) *Attorney, Agent, or Firm* — Conley Rose, P.C.

(57) ABSTRACT

An articulated flowline connection, or coupling, between a flowline and a structure. In some embodiments, the coupling includes a housing and three cylindrical members, each disposed within the housing. The housing has a first longitudinal centerline. The first cylindrical member is rotatable relative to the housing about the first centerline, the first cylindrical member supporting the flowline, whereby the flowline is rotatable about the first centerline relative to the housing. The second cylindrical members are immovable relative to the structure. The housing and the first cylindrical member disposed therein are rotatable about a second axis normal to the first centerline relative to the second and third cylindrical members, whereby the flowline is rotatable about the second axis relative to the structure. In some embodiments, the flowline is also rotatable about a third axis normal to the first centerline and the second axis relative to the coupling.

28 Claims, 13 Drawing Sheets

ARTICULATED FLOWLINE CONNECTION

CROSS REFERENCE TO RELATED APPLICATIONS

This application claims benefit of U.S. provisional application Ser. No. 61/093,342 filed on Aug. 31, 2008, and entitled "Flowline Termination," which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

Embodiments of the invention relate generally to couplings between a structure and a flowline, such as a fluid transfer line extending between two floating structures, a riser suspended from a floating structure, or a riser extending from the seafloor. More particularly, embodiments of the invention relate to apparatus and methods for coupling the flowline to the structure such that the flowline is rotatable relative to the structure.

Flowlines are typically used to transfer fluid between two floating structures, or between a floating structure and a fixed structure. For example, the gravity actuated pipe (GAP) developed by Single Buoy Moorings, Inc. is a deepwater fluid transfer system including one or more neutrally buoyant flowlines suspended between two structures, at least one of which is floating. Each flowline is coupled at each end to a support frame, which is, in turn, coupled to one of the structures by a connecting chain. Flexible jumpers, each connected between a flowline and one of the structures, transfer fluid to or from the structures, depending on the direction of fluid flow through the flowline.

The flexible nature of the jumpers and connecting chains permits limited movement of the flowlines relative to the structures between which they are coupled in response to surrounding water currents and motions of the floating structure(s). Although this relative motion is desirable, repeated movement of these components causes them to be susceptible to fatigue damage that may limit the service life of the GAP system. In particular, the connecting chains and flowlines, proximate their midpoint, experience fatigue due to cyclic bending and flexing.

Risers are often used to transfer fluid between the seafloor and a floating structure. The riser may be coupled to the floating structure by a joint assembly. The joint assembly includes a stiff cylindrical can that radially surrounds a portion of the riser and is coupled by means of supports or guides to the hull of the floating structure. To alleviate high stresses to the riser which would result from directly coupling the riser to the cylindrical can, the joint assembly further includes a stress joint coupled between the upper end of the riser and the cylindrical can. In operation, the joint enables limited angular movement of the riser relative to the floating structure caused by surrounding water currents and/or motion of the floating structure. Loads, and associated stresses, imparted to the riser are transferred from the riser through the stress joint to the supports, bypassing the upper end of the riser and thus preventing high stresses in the riser at this location. Although the joint assembly may be an effective coupling means, manufacturing the assembly, in particular the stress joint, is costly.

SUMMARY OF THE PREFERRED EMBODIMENTS

An articulated flow connection, or coupling, between a flowline and a structure and associated methods are disclosed. In some embodiments, the coupling includes a housing and three cylindrical members. The housing has a tubular member with a first longitudinal centerline and two tubular portions, each tubular portion extending normally from the tubular member and having a second longitudinal centerline normal to the first centerline. The first cylindrical member is disposed within the tubular member and rotatable relative to the tubular member about the first centerline, the first cylindrical member supporting the flowline, whereby the flowline is rotatable about the first centerline relative to the housing. The second cylindrical member is disposed within one tubular portion, and the third cylindrical member is disposed within the other tubular portion, the second and third cylindrical members immovable relative to the structure. The housing and the first cylindrical member disposed therein are rotatable about the second centerline relative to the second and third cylindrical members, whereby the flowline is rotatable about the second centerline relative to the structure.

In some embodiments, the coupling includes a housing, two cylindrical members, and a flowline support frame. The housing has a central portion with a throughbore and two tubular portions, each tubular portion extending normally from the central portion and having a first longitudinal centerline. The first cylindrical member is disposed within one tubular portion, and the second cylindrical member is disposed within the other tubular portion, the first and second cylindrical members immovable relative to the structure, wherein the housing is rotatable about the first centerline relative to the structure. The flowline support frame supports the flowline and is disposed within the throughbore. The flowline support frame is supported by two pins extending therefrom, each pin received within a bore in the central portion and having a second longitudinal centerline normal to the first centerline, whereby the flowline support frame is rotatable about the second centerline relative to the housing, whereby the flowline is rotatable about the second centerline relative to the housing.

Some methods for coupling the flowline to the structure include disposing two cylindrical members within opposing ends of a housing, wherein the cylindrical members have a first longitudinal centerline and are immovable relative to the structure and wherein the housing is rotatable about the first centerline relative the cylindrical members. The methods further include coupling the flowline to the housing, whereby the flowline is rotatable relative to the housing about a second axis normal to the first centerline.

Thus, the embodiments of the invention comprise a combination of features and advantages that enable substantial enhancement of couplings. These and various other characteristics and advantages of the invention will be readily apparent to those skilled in the art upon reading the following detailed description of the preferred embodiments of the invention and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
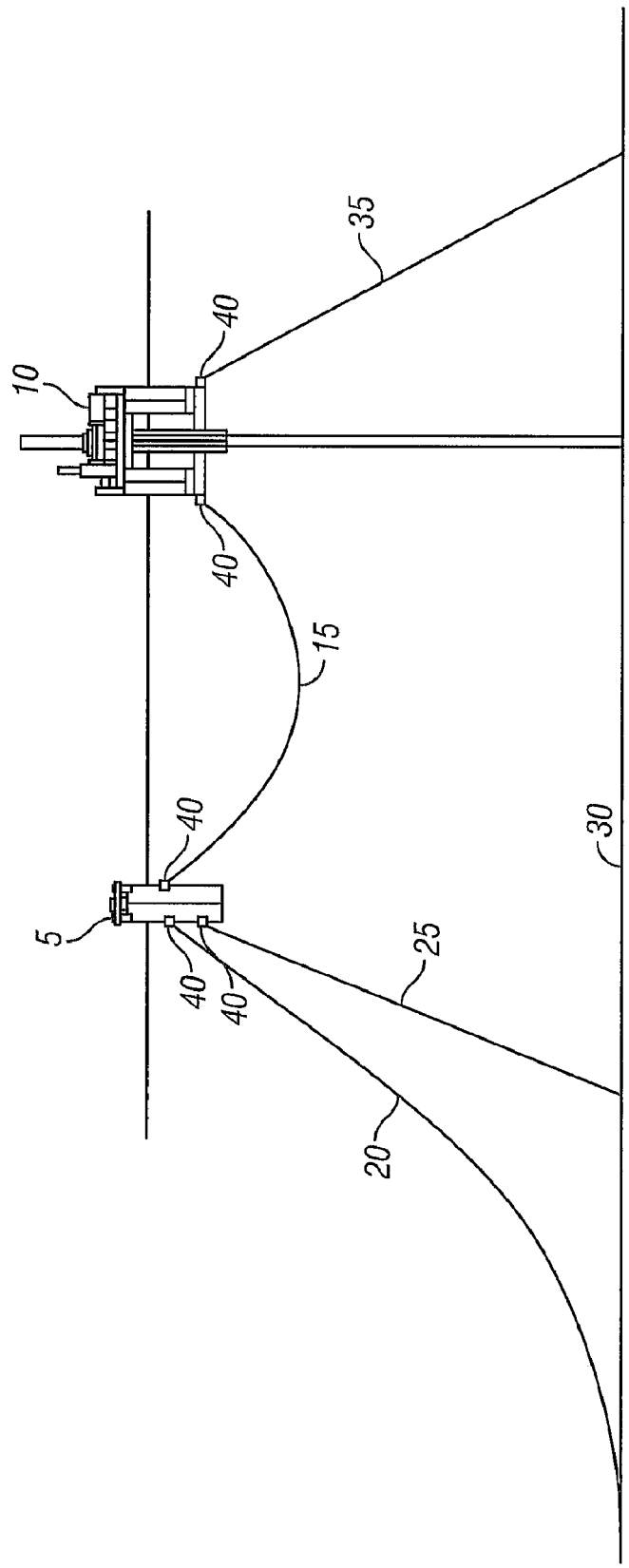
FIG. 1 is a schematic representation of a moored storage vessel and a moored floating platform with a fluid transfer line extending therebetween, the fluid transfer line coupled at one end to the storage vessel and the other end to the floating platform by an articulated flowline connection in accordance with the principles disclosed herein.

Various embodiments of the invention will now be described with reference to the accompanying drawings, wherein like reference numerals are used for like parts throughout the several views. The drawings in the figures are not necessarily to scale. Certain features of the invention may be shown exaggerated in scale or in somewhat schematic form, and some details of conventional elements may not be shown in the interest of clarity and conciseness.

Also, in the following discussion and in the claims, the terms "including" and "comprising" are used in an open-ended fashion, and thus should be interpreted to mean "including, but not limited to . . . " Further, the term "couple" or "couples" is intended to mean either an indirect or direct connection. Thus, if a first device couples to a second device, that connection may be through a direct connection, or through an indirect connection via other devices and connections.

Preferred embodiments of the invention relate to flowline terminations, also referred to herein as couplings, for engaging flowlines to floating structures. The invention is susceptible to embodiments of different forms. There are shown in the drawings, and herein will be described in detail, specific embodiments of the invention with the understanding that the disclosure is to be considered an exemplification of the principles of the invention and is not intended to limit the invention to that illustrated and described herein. It is to be fully recognized that the different teachings of the embodiments discussed below may be employed separately or in any suitable combination to produce desired results.

Referring now to FIG. 1, two floating structures 5, 10 are shown with a flowline 15 extending therebetween. In this exemplary embodiment, floating structures 5, 10 are a moored storage vessel 5 and a moored platform 10. However, in other embodiments, floating structures 5, 10 may each be another type of floating structure, such as but not limited to a vessel, or a fixed structure which does not move. Flowline 15 enables the transfer of fluid between vessel 5 and platform 10 and is typically referred to as a fluid transfer line. Flowline 15 may alternatively extend between a fixed structure and a floating structure. In such embodiments, flowline 15 would then enable fluid transfer between the fixed and floating structures. Referring still to FIG. 1, two flowlines 20, 25 extend from storage vessel 5 to the seafloor 30, and a flowline 35 extends from moored platform 10 to the seafloor 30. Flowlines 20, 25, 35 enable the transfer of fluid from the seafloor 30 to floating structures 5, 10 and may each be a riser, such as but not limited to a catenary riser, or other type of flowline. Each flowline 20, 25, 35 is coupled to its respective floating structure 5, 10 by an articulated flowline connection 40 in accordance with the principles of the invention. For the sake of brevity, articulated flowline connection 40 is also referred to herein as coupling 40.

Figure 2:
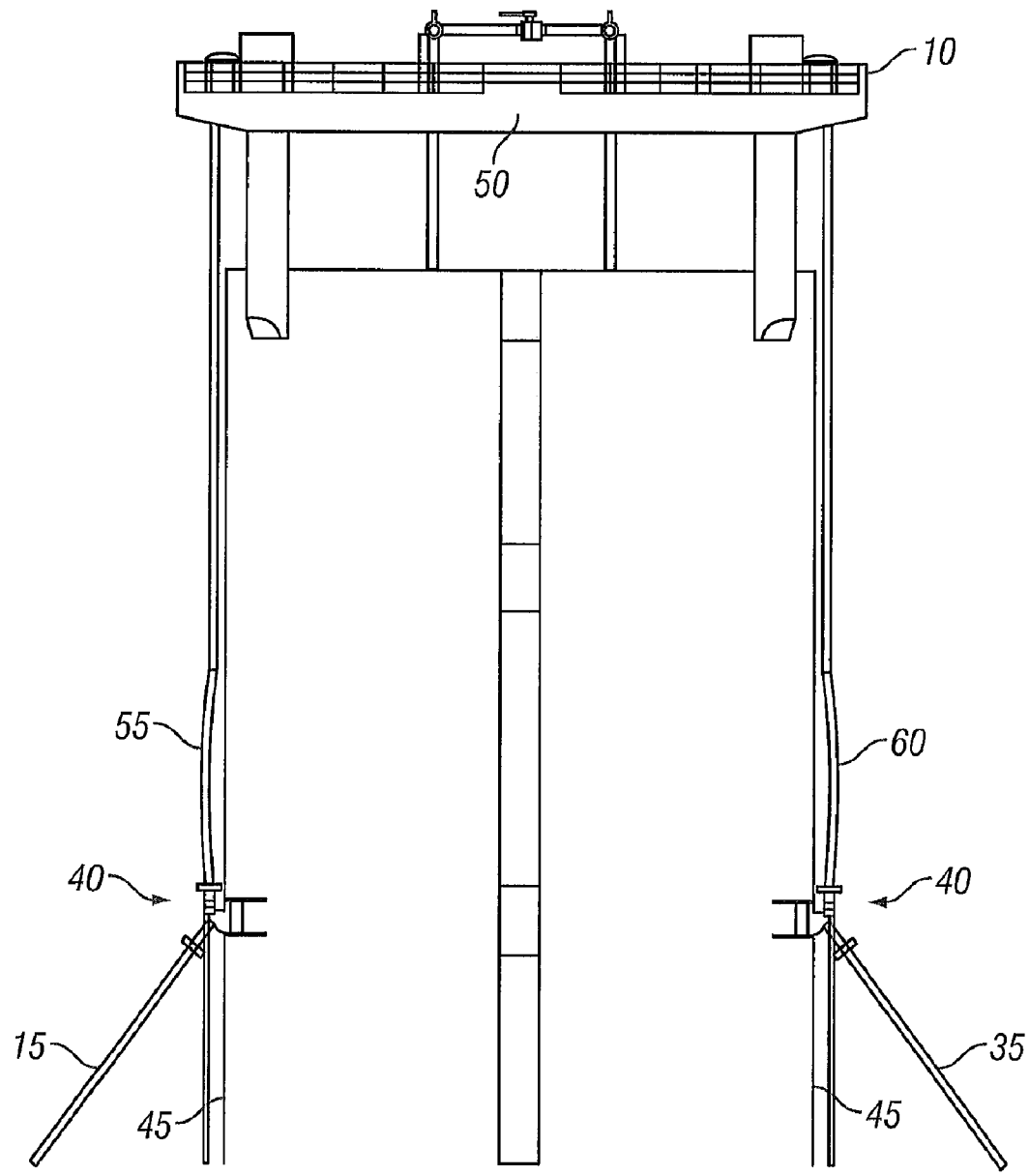
FIG. 2 is an enlarged view of the articulated flowline connections coupled to the floating platform of FIG. 1.

Turning next to FIG. 2, floating platform 10 includes a hull 45 and a topside 50. Flowline terminations, or couplings, 40 disposed between flowlines 15, 35 and floating platform 10 are coupled to hull 45. The upper end of flowline 15 is inserted through a coupling 40 and coupled to a flexible line 55, which, in turn, extends to topside 50. Similarly, the upper end of flowline 35 is inserted through another coupling 40 and coupled to a flexible line 60, which also extends to topside 50. Flexible lines 55, 60 enable the transfer of fluid in flowlines 15, 35, respectively, to topside 50. Flexible lines 55, 60 also enable the transfer of fluid from topside 50 to flowlines 15, 35, respectively.

Figure 3:
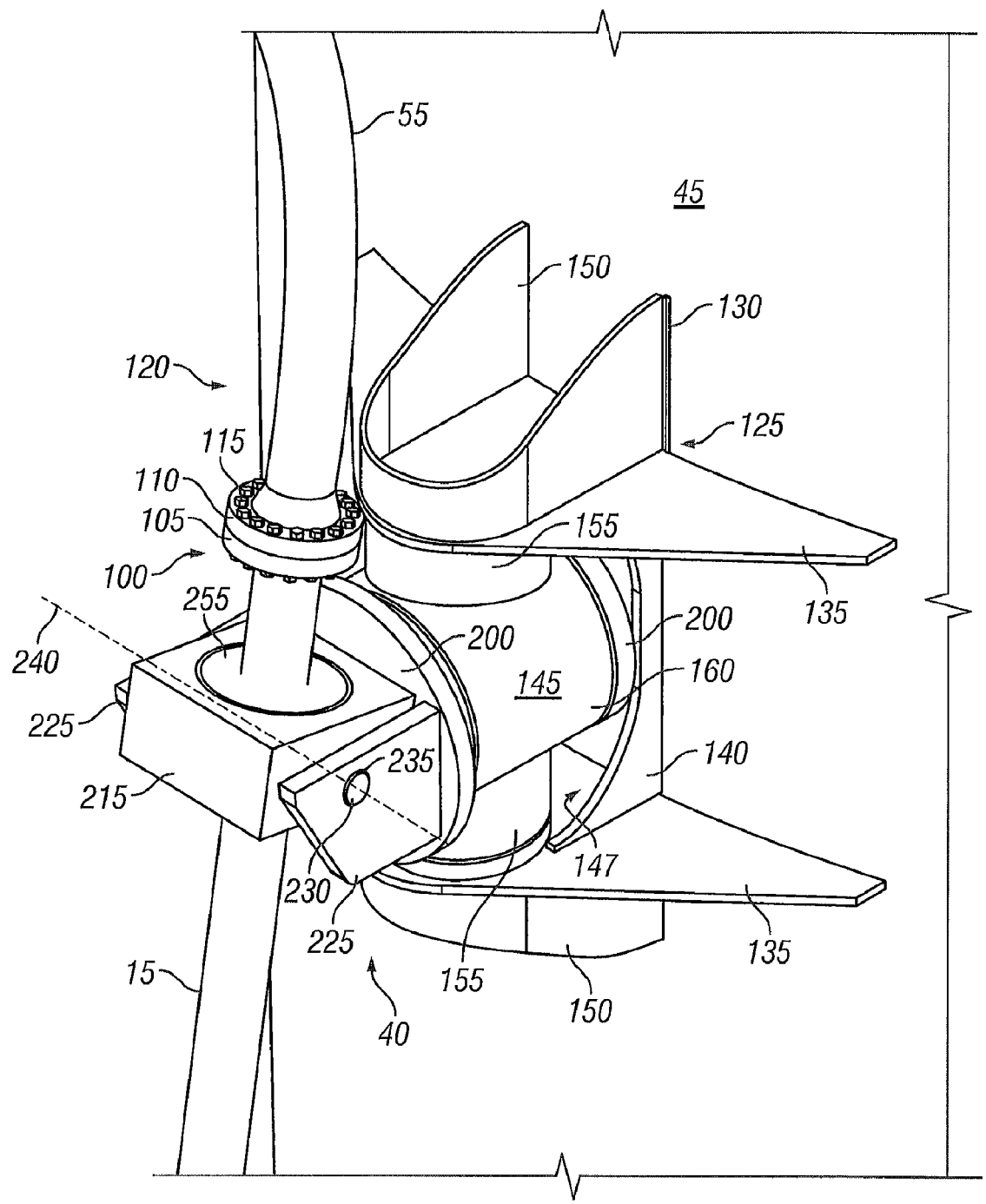
FIG. 3 is a perspective view of one articulated flowline connection of FIG. 2.
Figure 4:
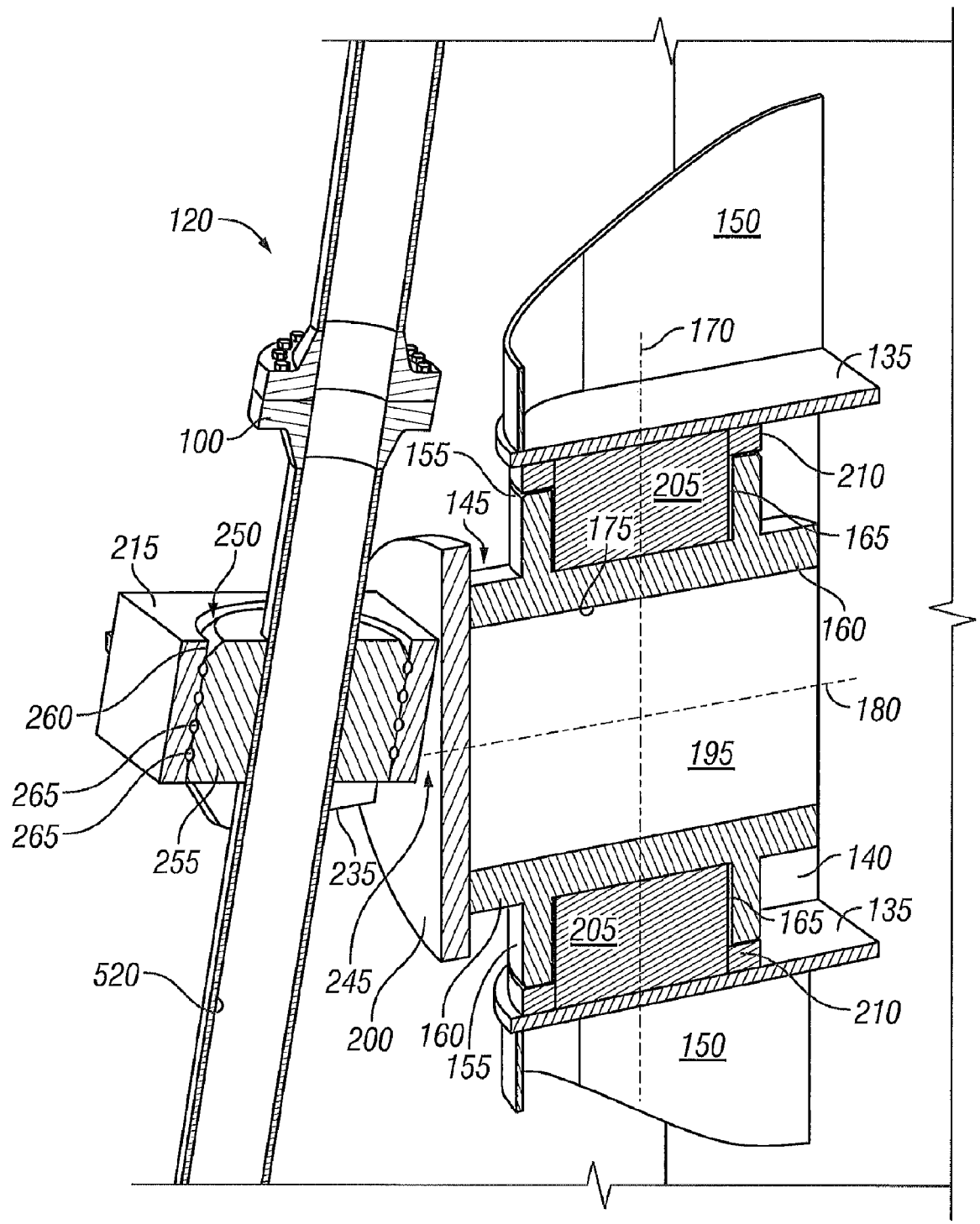
FIG. 4 is a cross-sectional view of the articulated flowline connection of FIG. 3.

The coupling 40 disposed between flowline 15 and flexible line 55 is shown in FIGS. 3 and 4 and described as follows. It is to be understood that the description of coupling 40, while presented in the context of coupling flowline 15 to platform 10, applies equally to other couplings 40 shown in and described with reference to FIGS. 1 and 2. Referring now to FIGS. 3 and 4, flowline 15 is coupled to flexible line 55 by a flanged connection 100. Flanged connection 100 includes a flanged plate 105 connected to flowline 15, a flanged plate 110 connected to flexible line 55, and a plurality of fasteners 115 extending therethrough to couple plates 105, 110, and thus flowline 15 and flexible line 55, to each other. The coupled flowline 120 formed by flowline 15 and flexible line 55 is received and supported by coupling 40, as will be described.

Coupling 40 includes a support frame 125 coupled to hull 45 of floating platform 10. Frame 125 may be coupled to hull 45 by a plurality of welds 130, as shown, or other equivalent means. Frame 125 includes two lateral plates 135 extending normally from hull 45 and two vertical plates 140 extending normally from both hull 45 and lateral plates 135. Each vertical plate 140 includes a cut-out 147. Lastly, frame 125 includes two curved, stiffening plates 150, each plate 150 coupled to a different lateral plate 135 and hull 45. Curved plates 150 enhance the structural capacity of frame 125, which supports the remaining components of coupling 40 described below.

Coupling 40 further includes a housing 145 disposed between lateral plates 135 of frame 125. Housing 145 is formed by the union of a first annular or tubular portion 155 and a second annular or tubular portion 160 substantially normal to and substantially bisecting the first tubular portion 155. The union of first and second tubular portions 155, 160 may be formed via welding or another equivalent type of connecting means. Alternatively, housing 145 may be formed such that first and second tubular portions 155, 160 are integral, such as by casting.

Second tubular portion 160 has a throughbore 175 with a longitudinal centerline or axis 180. Coupling 40 further includes a flanged cylindrical member 195 inserted into throughbore 175 of second tubular portion 160. Cylindrical member 195 is rotatable within second tubular portion 160 about axis 180. Further, cylindrical member 195 has two flanged ends 200. Flanged ends 200 prevent cylindrical member 195 from translating relative to second tubular portion 160. Thus, cylindrical member 195 cannot disengage second tubular portion 160 during operation of coupling 40.

The union of first and second tubular portions 155, 160 forms two cylindrical recesses 165, each proximate a different end of first tubular portion 155 and having a longitudinal centerline or axis 170 normal to axis 180. Coupling 40 further includes two cylindrical members 205. Each member 205 is disposed within a different recess 165 and includes a flanged end 210 coupled to a different lateral plate 135 of frame 125. First tubular portion 155 is rotatable about axis 170 relative to cylindrical members 205, the latter remaining fixed due to their coupling to frame 125, and thus hull 45. As first tubular portion 155 rotates about axis 170, second tubular portion 160 also rotates about axis 170 by virtue of second tubular portion 160 being connected to, or in some embodiments, integral with first tubular portion 155. Cut-outs 147 in vertical plates 135 of support frame 125 allow second tubular portion 160 to rotate freely in this manner without impediments imposed by support frame 125.

Coupling 40 further includes a housing or frame 215 and two support plates 225. As will be described, frame 215 supports flowline 120. Each support plate 225 is coupled to the flanged end 200 of cylindrical member 195 distal hull 45 and extends substantially normally therefrom. Plates 225 are spaced apart a distance sufficient to receive frame 215 therebetween. A pin, or other equivalent coupling member, 230 is inserted through a bore 235 in each plate 225 and is coupled to frame 215. Pins 230 have a longitudinal centerline or axis 240 normal to axes 170, 180. Frame 215 is rotatable about pins 230 relative to plates 225 and cylindrical member 195 coupled thereto. The degree to which frame 215 rotates about pins 230 about axis 240 relative to can be dependent upon clearance 245 between frame 215 and flanged end 200 of cylindrical member 195. In some embodiments, frame 215 is rotatable about axis 240 up to 10 degrees in either direction. In other embodiments, clearance 245 may be modified to permit more or less rotation of frame 215 and/or a member coupled to frame 215 to limit the motion of frame 215 about axis 240.

Frame 215 further includes a throughbore 250 configured to receive an annular member 255 disposed about flowline 120. Annular member 255 is coupled to flowline 120, such as by but not limited to welding. When annular member 255 with flowline 120 coupled thereto is inserted into throughbore 250, as shown, annular member 255 may be coupled to frame 215 by welding, a ballgrab connection, or other type of connection known in the industry.

In the exemplary embodiment illustrated by FIGS. 3 and 4, frame 215 releasably couples to flowline 120 by means of a ballgrab connection. Throughbore 250 of frame 215 is bounded by an inner surface 260 of frame 215. Frame 215 further includes a plurality of spherically-shaped members, or balls, 265 which are extendable from inner surface 260 to grip annular member 255 when annular member 255 is inserted into throughbore 250, as shown, and retractable to release annular member 255 when desired. Balls 265 may be nonuniformly or uniformly, such as in one or more rows, dispersed about the circumference of inner surface 260. Balls 265 may be actuated by spring load, pressure, and/or other mechanism to extend from inner surface 260 to engage annular member 255. When actuated to grip annular member 255, as shown, balls 265 contact annular member 255 and create indentations in annular member 255 enabling frame 215 to grip and support annular member 255, as well as to prevent annular member 255, and flowline 120 coupled thereto, from moving relative to frame 215, and thus coupling 40 and hull 45. To disengage annular member 255 from frame 215, balls 265 are actuated to retract from annular member 255, thereby releasing annular member 255 and allowing annular member 255 to be moveable relative to frame 215.

Coupling 40 enables rotation of flowline 120 relative to platform 10 in three coordinate planes. First, as described above, flowline 120 is rotatable about axis 240 via the engagement of pins 230 with frame 215 and clearance 245 between frame 215 and flanged end 200 of cylindrical member 195. Second, flowline 120 is rotatable about axis 180 via the coupling of support plates 225 to flanged end 200 of cylindrical member 195. As previously described, cylindrical member 195 is rotatable within second tubular portion 160 about axis 180. Third, flowline 120 is rotatable about axis 170 via the coupling of support plates 225 to flanged end 200 of cylindrical member 195. As previously described, cylindrical member 195 is inserted into throughbore 175 of second tubular portion 160. Second tubular portion 160, in turn, is connected to or integral with first tubular portion 155. First tubular portion 155 is rotatable about axis 170 relative to cylindrical members 205.

Therefore, when force is exerted on flowline 120 by surrounding water, whether due to movement of platform 10 relative to flowline 120, water currents, and/other factors, flowline 120 freely rotates in any or all coordinate directions. Enabling free rotation of flowline 120 in this manner minimizes loads, and associated stress and fatigue damage, to flowline 120. Further, given that coupling 40 consists primarily of cylindrical pipe segments and plates, manufacturing costs for coupling 40 are greatly reduced in comparison to conventional coupling systems, particularly those involving complex components like a stress joint.

Figure 5:
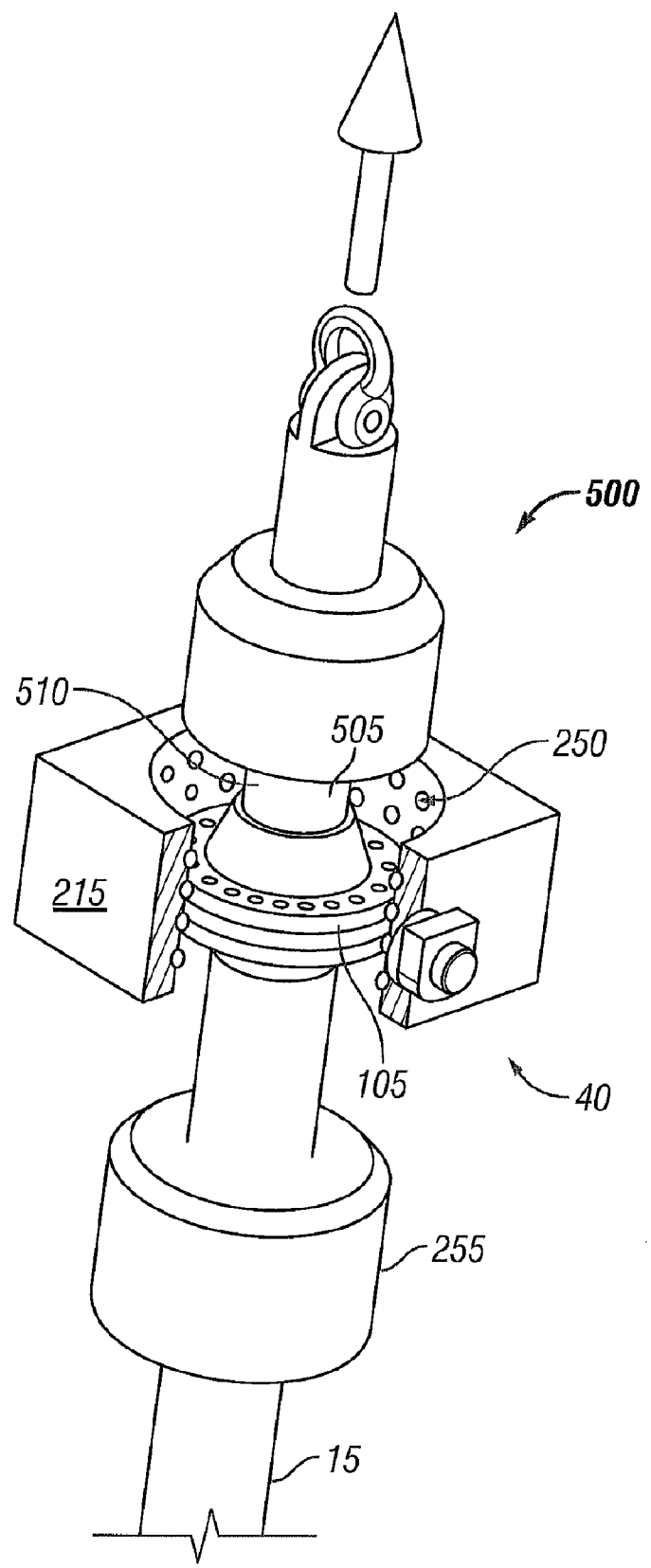
FIGS. 5 and 6 illustrate different stages of the installation sequence for the articulated flowline connection of FIGS. 3 and 4.

Referring now to FIG. 5, to couple flowline 120 to platform 10, as shown in FIGS. 3 and 4, via coupling 40, annular member 255 is first disposed about and coupled to flowline 15 proximate flanged plate 105. A lifting device 500 is then coupled to flowline 15 proximate flanged plate 105. Lifting device 500 may be coupled to flowline 15 by welding, a ballgrab connection, or other type of connection known in the industry. In the exemplary embodiment illustrated by FIG. 5, lifting device 500 couples to flowline 15 via a ballgrab connection, similar to that described above with reference to FIG. 4. Lifting device 500 includes a tubular extension 505 having an outer surface 510 over which a plurality of spherically-shaped members, or balls, 515, similar to balls 265 of frame 215, are disposed. Balls 515 are extendable and retractable under spring load, pressure load, and/or other actuation means relative to outer surface 510. Tubular extension 505 is inserted into the free end of flowline 15, and balls 515 are actuated to engage or grip the inner surface 520 (FIG. 4) of flowline 15. Once so engaged, device 500 is used to lift flowline 15 and pull flowline 15 upward through bore 250 of frame 215, shown in partial cross-section, of coupling 40.

Figure 6:
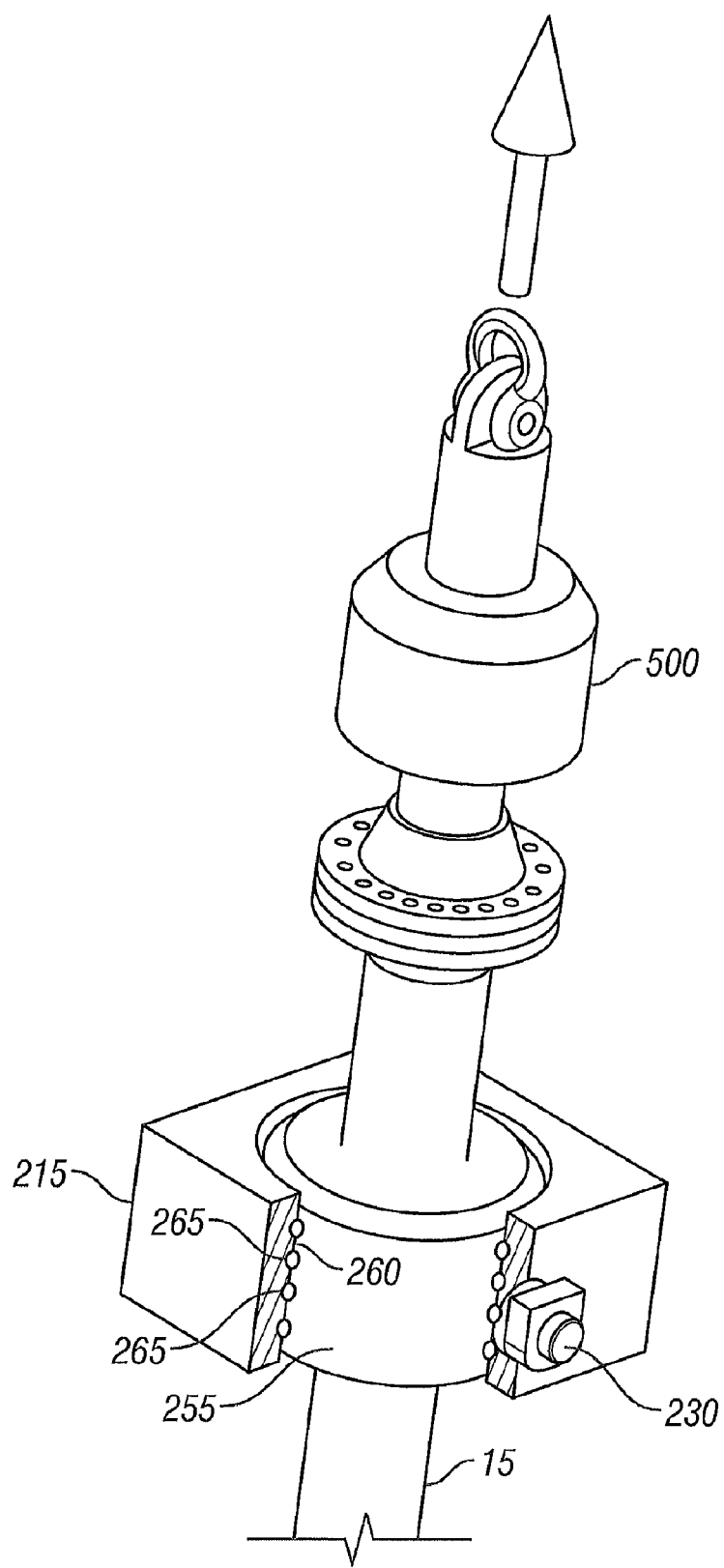
Figure 7:
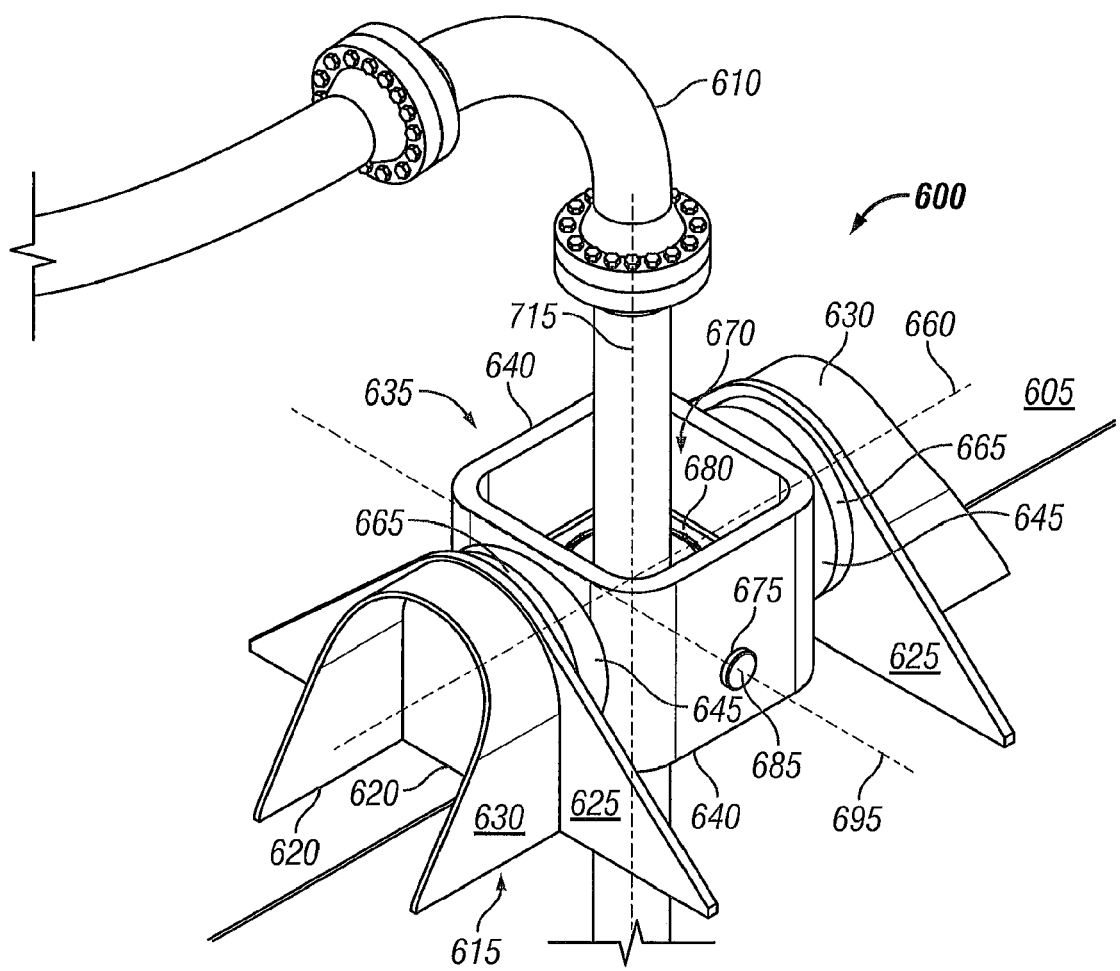
FIG. 7 is a perspective view of another embodiment of an articulated flowline connection in accordance with the principles disclosed herein.
Figure 8:
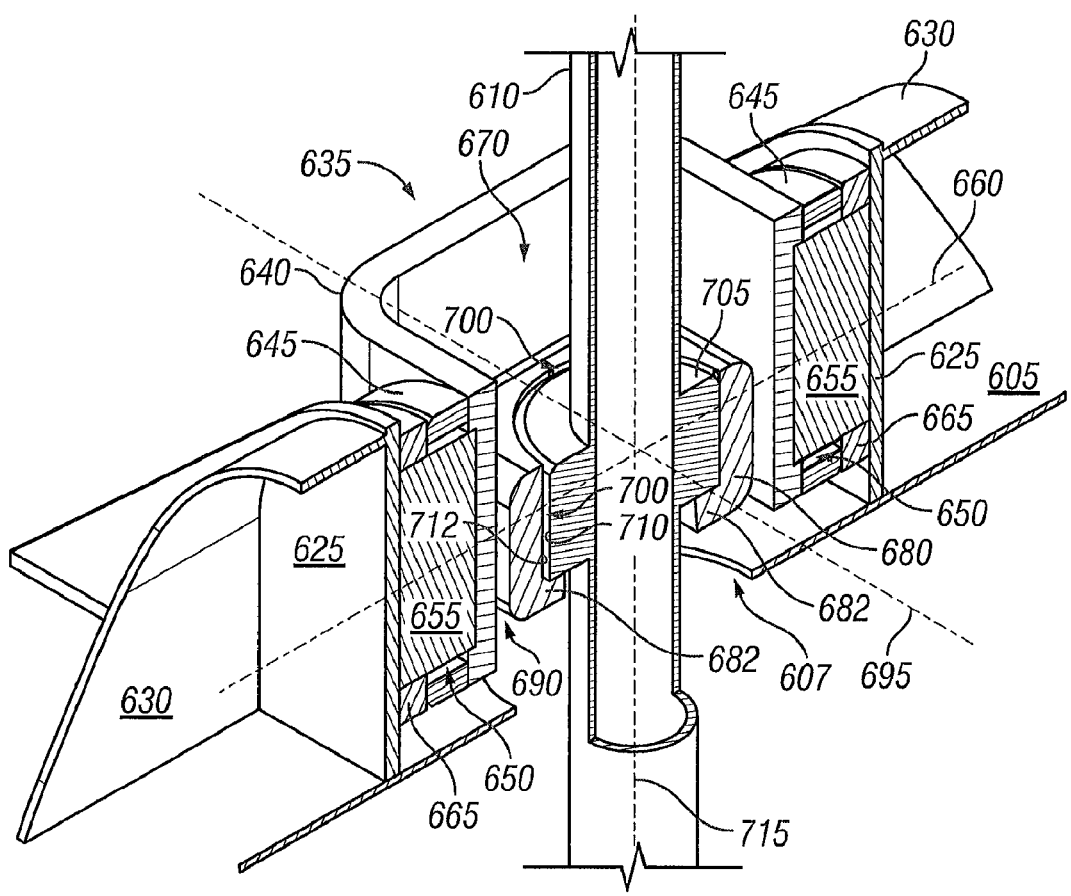
FIG. 8 is a cross-sectional view of the articulated flowline connection of FIG. 7.

Turning finally to FIG. 6, when annular member 255 is positioned within throughbore 250 of frame 215, balls 265 are actuated to extend from surface 260 of frame 215 to grip annular member 255. Once balls 265 grip annular member 255, flowline 15 is supported by coupling 40. At this point, device 500 is decoupled from flowline 15, such as by actuating balls 515 to release flowline 15, and flexible line 55 is coupled to flowline 15 via flanged connection 100 to form flowline 120. Once installed, as shown in FIG. 3, flowline 120 is supported by coupling 40 and free to rotate relative to platform 10, as described above, in response to changing water currents and/or movements of platform 10.

Articulated flowline connection 40 previously described enables coupling of flowline 120 to a substantially vertically extending structure, such as hull 45 of platform 10. Turning now to FIGS. 7 through 10, another embodiment of an articulated flowline connection is shown. In this embodiment, articulated flowline connection 600 enables suspension of a flowline from a substantially laterally extending structure 605 with a cutout 607 formed therein. Structure 605 may be a fixed platform, which does not move, or a floating platform or vessel. Moreover, structure 605 may be a subcomponent of an assembly coupled to a fixed or floating platform, wherein the subcomponent, or structure 605, may move relative to the assembly or remain fixed relative to the assembly. Articulated flowline connection, or coupling, 600 is connected to structure 605 over cutout 607 such that a flowline 610, when coupled thereto, is suspended through cutout 607 in structure 605 to hang freely below. Thus, coupling 600 is particularly suited for, but not limited to, riser hangoff from a fixed or floating platform. Flowline 610 is operable to convey fluid, whether liquid, gas, or mixture thereof, and may be a flowline, jumper, pipe, or riser. In this exemplary embodiment, structure 605 is a fixed or floating platform, and flowline 610 is riser suspended from platform 605.

Coupling 600 includes a support frame 615 coupled to platform 605. Frame 615 may be coupled to platform 605 by a plurality of welds 620, as shown, or other equivalent means. Frame 615 includes two vertical plates 625 extending normally from platform 605 and two curved, stiffening plates 630, each plate 630 extending normally from a different vertical plate 625 and platform 605. Curved plates 630 enhance the structural capacity of frame 615, which supports the remaining components of coupling 600 described below.

Coupling 600 further includes a housing 635 disposed between vertical plates 625 of frame 615. Housing 635 includes a central portion 640 and two tubular portions 645, each tubular portion 645 extending normally from opposing sides of central portion 640. In this embodiment, central portion 640 is rectangular in shape. Housing 635 may be formed by welding rectangular portion 640 and tubular portions 645. Alternatively, housing 635 may be formed such that rectangular portion 640 and tubular portions 645 are integral, such as by casting. Rectangular portion 640 has a throughbore 670 extending therethrough and two bores 675 extending through opposing sides of rectangular portion 640. As is shown and will be described, riser 610 is supported within throughbore 670.

Each tubular portion 645 has a cylindrical recess 650 with a longitudinal centerline or axis 660. Coupling 600 further includes two flanged cylindrical members 655. Each member 655 is disposed within a different recess 650. Further, each member 655 has a flanged end 665 coupled to a different vertical plate 625 of frame 615. Housing 645 is rotatable about axis 660 relative to cylindrical members 655, the latter remaining fixed due to their coupling to frame 615, and thus platform 605.

Coupling 600 further includes a rectangular housing or frame 680 with two pins 685 extending from opposing sides of frame 680. One pin 685 is visible in FIGS. 7 and 9, and extends from side 681 of frame 680. Frame 680 has a side 683 disposed opposite side 681. The second pin 685, although not visible in these figures, extends from side 683. As is shown and will be described, frame 680 supports riser 610. Each pin 685 has a longitudinal centerline or axis 695 normal to axis 660. Frame 680 is disposed within throughbore 670 of housing 635 with pins 685 received within bores 675. Further, frame 680 is rotatable about pins 685 relative to housing 635. The degree to which frame 680 is rotatable about pins 685, or centerline 695, relative to housing 635 can be dependent upon clearance 690 (FIG. 8) between frame 680 and rectangular portion 640 of housing 635. In some embodiments, frame 680 is rotatable about axis 695 up to 10 degrees in either direction. In other embodiments, clearance 690 may be modified to permit more or less rotation of frame 680 and/or a member coupled to frame 680 to limit the motion of frame 680 about axis 695.

Frame 680 further includes a throughbore 700 configured to receive an annular member 705 disposed about riser 610, a shoulder 682 extending into throughbore 700 to support annular member 705 when disposed in throughbore 700 of frame 680, and a longitudinal centerline or axis 715 normal to axes 660, 695. Annular member 705 is coupled to riser 610, such as by but not limited to welding. When annular member 705 is inserted into throughbore 700, as shown, annular member 705 is supported by shoulder 682 of frame 680 and may be further coupled to frame 680 by welding, a ballgrab connection similar to that previously described in connection with coupling 40, or other type of connection known in the industry.

Figure 9:
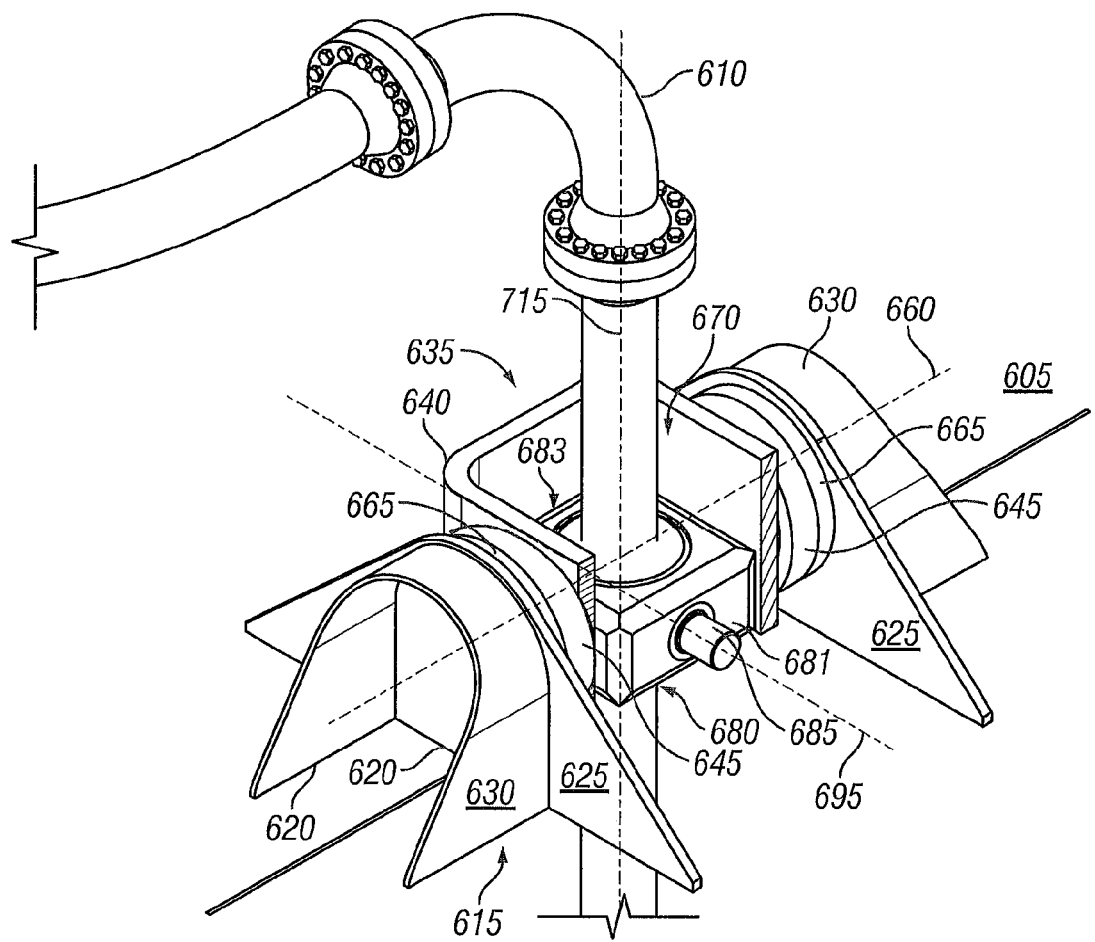
FIG. 9 is a perspective view in partial cross-section of the articulated flowline connection of FIG. 7, exposing the frame.
Figure 10:
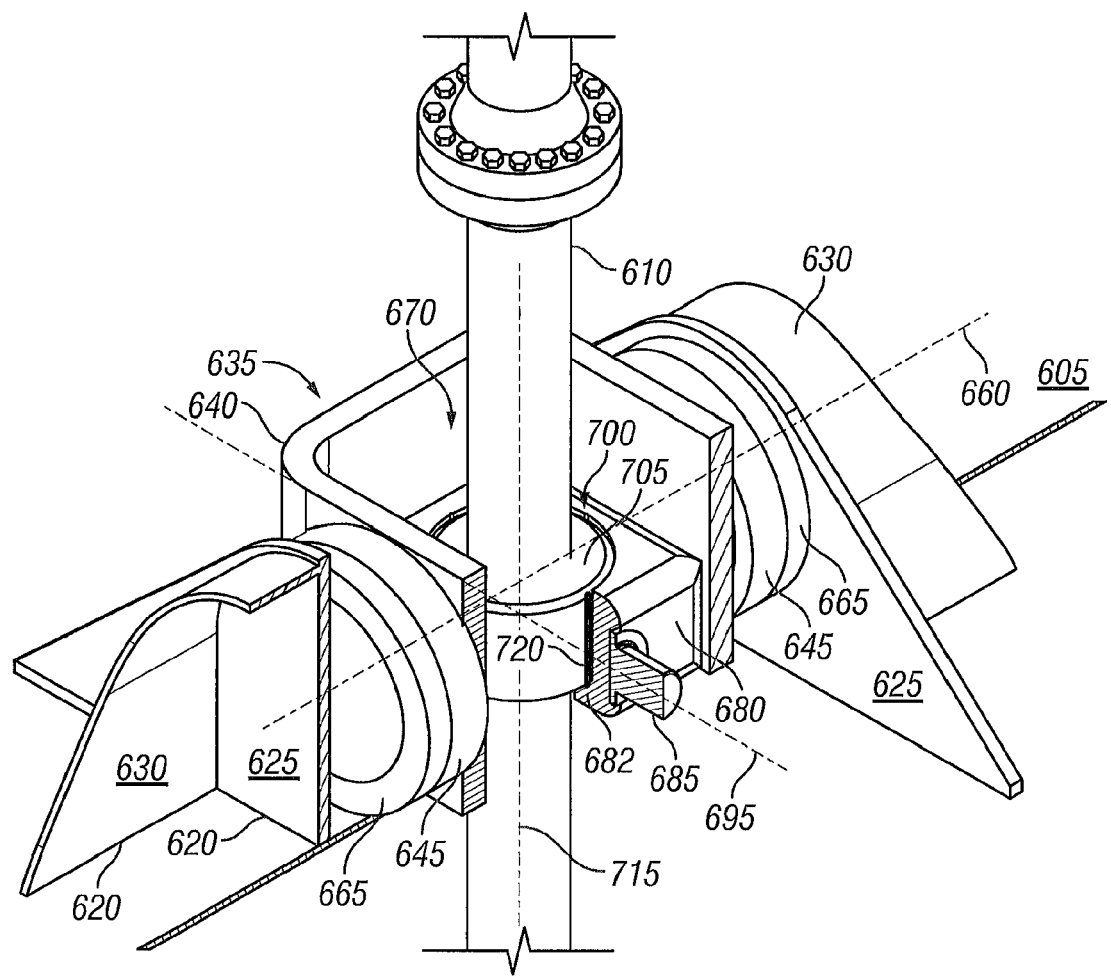
FIG. 10 is another perspective view in partial cross-section of the articulated flowline connection of FIG. 7, exposing the annular member disposed about the riser.

In the exemplary embodiment illustrated by FIGS. 7-10, annular member 705 has an outer surface 710 (FIG. 8), and throughbore 700 of frame 680 is bounded by an inner surface 712 (FIG. 9). Outer surface 710 of annular member 705 and/or inner surface 712 of frame 680 is a low friction surface enabling movement of annular member 705, and riser 610 coupled thereto, relative to frame 680. In some embodiments, the low friction surface(s) includes a plurality of Teflon strips 720 (FIG. 10) spaced circumferentially relative to axis 715. Teflon strips 720 enable relative movement of annular member 705 and frame 680. Shoulder 682 of frame 680 and the weight of riser 610 limit movement of annular member 705 within frame 680 to prevent annular member 705 from displacing axially relative to axis 715 and disengaging frame 680. At the same time, rotation of member 705, and thus riser 610 coupled thereto, about axis 715 relative to frame 680 is enabled by low frictions outer and inner surfaces 710, 712, respectively.

Figure 11:
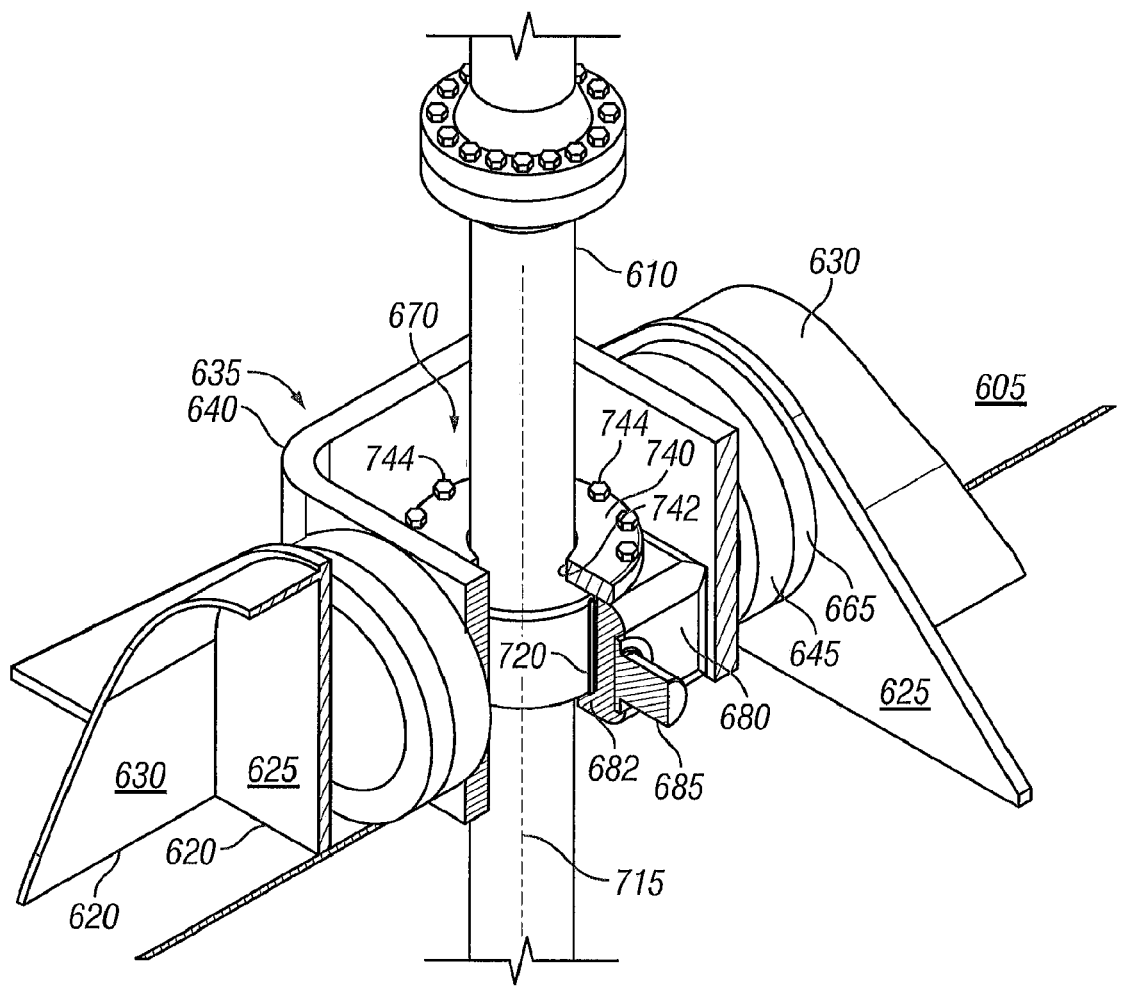
FIG. 11 is the same view as FIG. 10 but includes a retainer to restrict movement of the riser relative to the articulated flowline connection.

In some embodiments, coupling 600 further includes a retainer 740 that limits movement of annular member 705 and riser 610 coupled thereto relative to frame 680 in a direction parallel to axis 715 and upward or away from shoulder 682 of frame 680. Referring to FIG. 11, an example of retainer 740 is shown. In this embodiment, retainer 740 is an annular member having a throughbore 742 configured to receive riser 610 and coupled to frame 680, such as by a plurality of fasteners 744. Throughbore 742 is defined by a diameter that is smaller than a diameter of outer surface 710 of annular member 705. Thus, when installed about riser 610, as shown, annular member 705 is too large to pass through retainer 740. Further, when retainer 740 is coupled to frame 680, also as shown, axial movement, or movement in a direction parallel to axis 715, of annular member 705 within throughbore 700 of frame 680 is limited by shoulder 682 of frame 680 and retainer 740. Consequently, annular member 705 cannot disengage coupling 600.

Coupling 600 enables rotation of riser 610 relative to platform 605 in at least coordinate planes. First, as described above, riser 610 is rotatable about axis 695 via the engagement of pins 685 within housing 635 and clearance 690 between frame 680 and housing 635. Second, riser 610 is rotatable about axis 660 via housing 635, which is rotatably disposed about cylindrical members 655 coupled to fixed support plates 625. In embodiments wherein at least one of surface 710 of annular member 705 and surface 712 of frame 680 is a low friction surface, riser 610 is also rotatable about axis 715.

Therefore, when force is exerted on riser 610 by surrounding water, whether due to movement of platform 605 relative to riser 610, water currents, and/other factors, riser 610 freely rotates in at least two coordinate directions. Enabling free rotation of riser 610 in this manner minimizes loads, and associated stress and fatigue damage, to riser 610. Further, given that coupling 600 consists primarily of cylindrical pipe segments and plates, manufacturing costs for coupling 600 are greatly reduced in comparison to conventional coupling systems, particularly those involving complex components like a stress joint.

Figure 12:
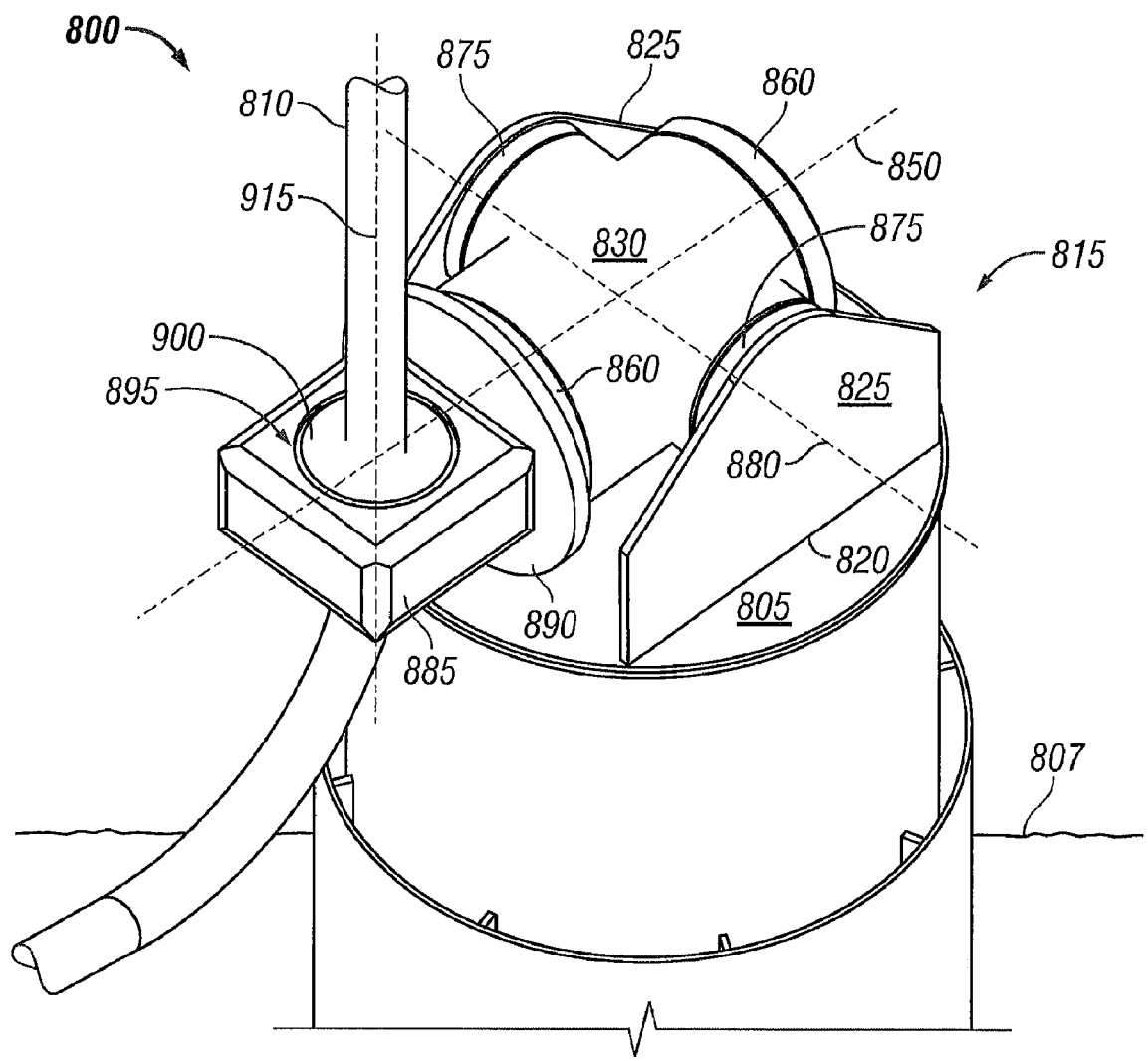
FIG. 12 is a perspective view of yet another embodiment of an articulated flowline connection in accordance with the principles disclosed herein.
Figure 13:
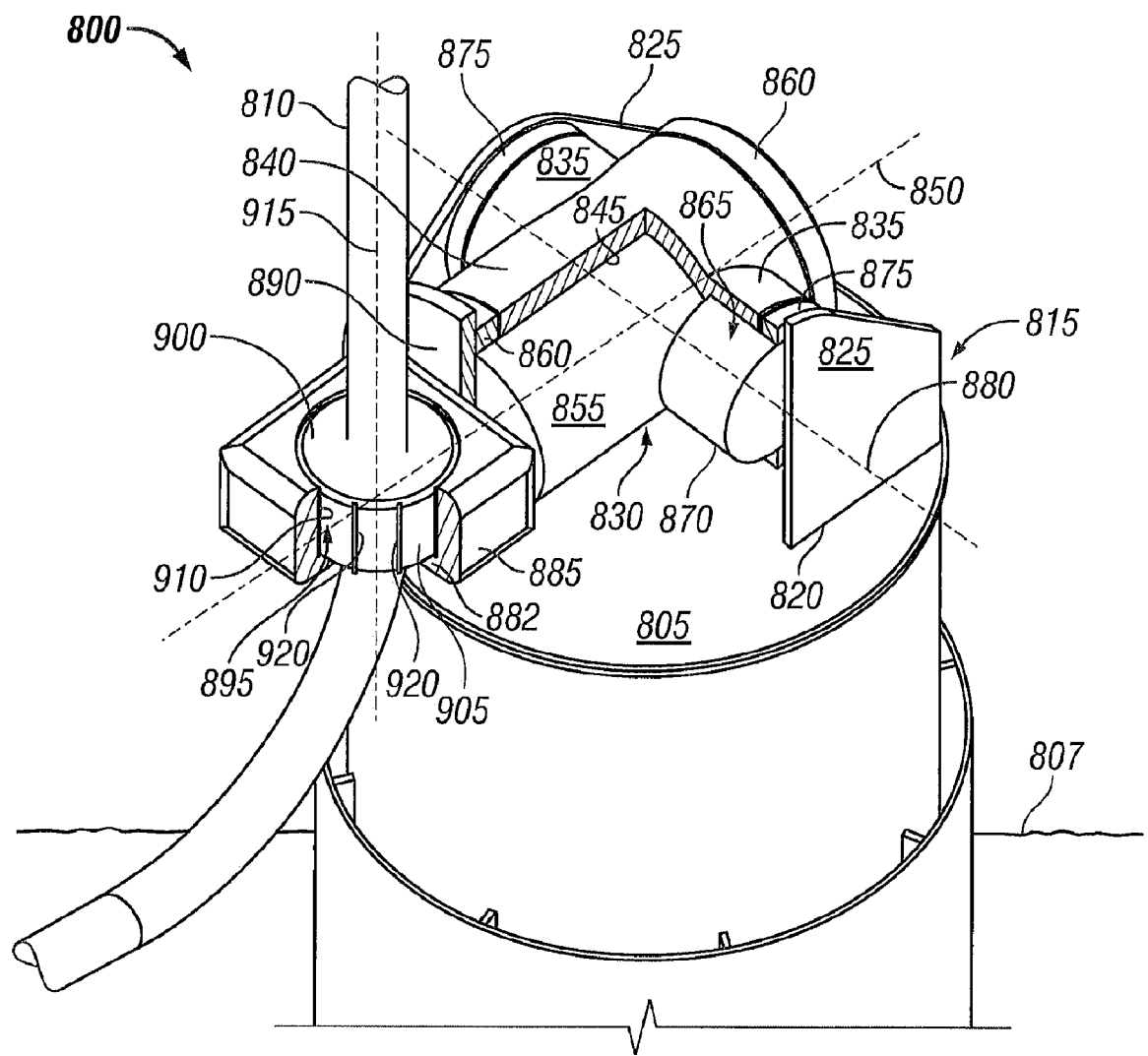
FIG. 13 is a perspective view in partial cross-section of the articulated flowline connection of FIG. 12.

Referring now to FIGS. 11 and 12, yet another embodiment of an articulated flowline connection is shown. In this embodiment, articulated flowline connection 800 is enables coupling of a flowline or riser to a substantially laterally extending structure 805. Structure 805 may be fixed, meaning it does not move, or moveable. Moreover, structure 805 may be a subcomponent of an assembly coupled that is fixed or moveable, wherein the subcomponent, or structure 805, may move relative to the assembly or remain fixed relative to the assembly. Articulated flowline connection 800 is connected to structure 805 such that a flowline 810, when coupled thereto, extends upward from structure 805. Thus, articulated flowline connection, or coupling, 800 is particularly suited for, but not limited to, coupling of a jumper to a base of a bottom tensioned riser. Flowline 810 is operable to convey fluid, whether liquid, gas, or mixture thereof, and may be a flowline, jumper, pipe, or riser. In this exemplary embodiment, structure 805 is a base of a bottom tensioned riser positioned proximate the seafloor 807, and flowline 810 is a jumper suspended from a fixed platform, a floating platform, or vessel, to riser base 805.

Coupling 800 includes a support frame 815 coupled to riser base 805. Frame 815 may be coupled to riser base 805 by a plurality of welds 820, as shown, or other equivalent means. Frame 815 includes two vertical plates 825 extending normally from riser base 805. Space permitting, frame 815 may optionally include two curved, stiffening plates coupled to and extending normally from vertical plates 825 and riser base 805. When present, the stiffening plates are similar in structure and function to stiffening plates 150 of coupling 40 previously described.

Coupling 800 further includes a housing 830 disposed between vertical plates 825 of frame 815. Housing 830 is formed by the union of a first annular or tubular portion 835 and a second annular or tubular portion 840 substantially normal to and intersecting the first tubular portion 835. The union of first and second tubular portions 835, 840 may be formed via welding or another equivalent type of connecting means. Alternatively, housing 830 may be formed such that first and second tubular portions 835, 840 are integral, such as by casting.

Second tubular portion 840 has a throughbore 845 and a longitudinal centerline or axis 850. Coupling 800 further includes a flanged cylindrical member 855 inserted into throughbore 845. Cylindrical member 855 is rotatable within second tubular portion 840 about axis 850. Further, cylindrical member 855 has two flanged ends 860. Flanged ends 860 prevent cylindrical member 855 from translating relative to second tubular portion 840. Thus, cylindrical member 855 cannot disengage second tubular portion 840 during operation of coupling 800.

The union of first and second tubular portions 835, 840 forms two cylindrical recesses 865, each proximate a different end of first tubular portion 835 and having a longitudinal centerline or axis 880. Coupling 800 further includes two flanged cylindrical members 870. Each member 870 is disposed within a different recess 865, and has a flanged end 875 coupled to a different lateral plate 825 of frame 815. First tubular portion 835 is rotatable about axis 880 relative to cylindrical members 870, the latter remaining fixed due to their coupling to frame 815, and thus riser base 805. As first tubular portion 835 rotates about axis 880, second tubular portion 840, with cylindrical member 855 disposed therein, also rotates about axis 880 by virtue of second tubular portion 840 being connected to, or in some embodiments, integral with first tubular portion 835.

Coupling 800 further includes a housing or frame 885 and a support plate 890. As is shown and will be described, frame 885 supports jumper 810. Support plate 890 is coupled to one flanged end 860 of cylindrical member 855, and frame 885, in turn, is coupled to support plate 890. Frame 885 has a throughbore 895 configured to receive an annular member 900 disposed about jumper 810, a shoulder 882 extending into throughbore 895 to support annular member 900 when disposed in throughbore 895, and a longitudinal centerline or axis 915 normal to axes 850, 880. Annular member 900 is coupled to jumper 810, such as by but not limited to welding. When annular member 900 is inserted into throughbore 895, as shown, annular member 900 is supported by shoulder 882 and may be further coupled to frame 885 by welding, a ballgrab connection similar to that described above in connection with coupling 40, or other type of connection known in the industry.

In the exemplary embodiment illustrated by FIGS. 11 and 12, annular member 900 has an outer surface 905, and throughbore 895 of frame 885 is bounded by an inner surface 910. Surface 905 of annular member 900 and/or surface 910 of frame 885 is a low friction surface enabling movement of jumper 810 relative to frame 885. In some embodiments, the low friction surface(s) includes a plurality of Teflon strips 920 spaced circumferentially relative to axis 915. Teflon strips 920 enable relative movement of annular member 900 and frame 885. Shoulder 882 of frame 885 and the weight of jumper 810 limit movement of annular member 900 within frame 885 to prevent annular member 900 from displacing axially relative to axis 915 and disengaging frame 885. At the same time rotation of member 900, and thus jumper 810, about axis 915 relative to frame 885 is enabled by low friction surface(s) 905, 910. In some embodiments, coupling 800 further includes a retainer similar to retainer 740 previously described that limits movement of annular member 900 and jumper 810 coupled thereto relative to frame 885 in a direction parallel to axis 915 and upward or away from shoulder 882 of frame 885.

Coupling 800 enables rotation of jumper 810 relative to riser base 805 in at least two coordinate planes. First, jumper 810 is rotatable about longitudinal axis 850 via the coupling of support plate 890 to flanged end 860 of cylindrical member 855. As previously described, cylindrical member 855 is rotatable within housing 830 about longitudinal axis 850. Second, jumper 810 is rotatable about longitudinal axis 880 via the coupling of support plate 890 to cylindrical member 855 disposed within housing 830. As previously described, housing 830 is rotatable about longitudinal axis 880 relative to cylindrical members 870, which remain fixed or stationary due to their coupling to frame 815 and thus riser base 805. In embodiments wherein at least one of surface 905 of annular member 900 and surface 910 of frame 885 is a low friction surface, jumper 810 is also rotatable about axis 915.

Therefore, when force is exerted on jumper 810 by surrounding water, whether due to movement of the platform from which it is suspended relative to jumper 810, water currents, and/or other factors, jumper 810 freely rotates in at least two coordinate directions. Enabling free rotation of jumper 810 in this manner minimizes loads, and associated stress and fatigue damage, to jumper 810. Further, given that coupling 800 consists primarily of cylindrical pipe segments and plates, manufacturing costs for coupling 800 are greatly reduced in comparison to conventional coupling systems, particularly those involving complex components like a stress joint.

As described above, coupling 600 may in some embodiments include a low friction surface(s) at the interface between annular member 705 and frame 680. Similarly, coupling 800 may include a low friction surface(s) at the interface between annular member 900 and frame 885. Low friction surfaces at these interfaces enable rotation of riser 610 and/or jumper 810 relative to their associated frame 680, 885. Coupling 40 may be modified to include a low friction surface(s) at the interface between annular member 255 and frame 215 for the same purpose.

Moreover, in some embodiments, each of couplings 40, 600, 800 may be modified to include a low function surface(s) at other rotational interfaces, meaning interfaces between two components that rotate relative to each other. For example, coupling 40 may include a low function surface(s) at the interface between cylindrical members 205 and first tubular portion 155 of housing 145 that would promote rotation of housing 145 about axis 170 relative to cylindrical members 205. Coupling 40 may include a low friction surface(s) at the interface between cylindrical member 195 and second tubular portion 160 of housing 145 that would promote rotation of cylindrical member 195 about axis 180 within housing 145. Coupling 600 may include a low friction surface(s) at the interface between tubular portions 645 of housing 635 and cylindrical members 655 to promote rotation of housing 635 about axis 660 relative to cylindrical members 655. Coupling 800 may include a low friction surface(s) at the interface between cylindrical member 855 and second tubular portion 840 of housing 830 and/or at the interface between cylindrical members 870 and first tubular portion 835 of housing 830 that promote rotation of cylindrical member 855 about axis 850 within housing 830 and rotation of housing 830 about axis 880 relative to cylindrical members 870, respectively.

While preferred embodiments have been shown and described, modifications thereof can be made by one skilled in the art without departing from the scope or teachings herein. The embodiments described herein are exemplary only and are not limiting. Many variations and modifications of the systems are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A coupling between a flowline and a structure, the coupling comprising:

a housing with a tubular member having a first longitudinal centerline and two tubular portions, each tubular portion extending normally from the tubular member and having a second longitudinal centerline normal to the first centerline;

a first cylindrical member disposed within the tubular member and rotatable relative to the tubular member about the first centerline, the first cylindrical member supporting the flowline, whereby the flowline is rotatable about the first centerline relative to the housing; and a second cylindrical member disposed within one tubular portion and a third cylindrical member disposed within the other tubular portion, the second and third cylindrical members immovable relative to the structure;

wherein the housing and the first cylindrical member disposed therein are rotatable about the second centerline relative to the second and third cylindrical members, whereby the flowline is rotatable about the second centerline relative to the structure.

2. The coupling of claim 1, further comprising a coupling support frame coupled between the structure and each of the second and the third cylindrical members.

3. The coupling of claim 2, wherein the coupling support frame comprises a first plate connected between the structure and the second cylindrical member and a second plate connected between the structure and the third cylindrical member.

4. The coupling of claim 3, wherein the coupling support frame further comprises a first curved plate connected to the first plate and the structure and a second curved plate connected to the second plate and the structure.

5. The coupling of claim 1, further comprising a flowline support frame having a throughbore within which the flowline is received and coupled to the first cylindrical member, whereby the flowline support frame is rotatable about the first centerline.

6. The coupling of claim 5, wherein the flowline support frame is coupled to an annular member disposed about the flowline and received within the throughbore of the flowline support frame.

7. The coupling of claim 6, wherein the flowline support frame comprises a ball grab connection releasably coupling the annular member.

8. The coupling of claim 6, wherein the flowline support frame has a third longitudinal centerline normal to the first and the second centerlines and wherein at least one of an inner surface of the flowline support frame bounding the throughbore and an outer surface of the annular member is a low friction surface enabling rotation of the flowline about the third centerline relative to the flowline support frame.

9. The coupling of claim 8, wherein at least one of the inner surface and the outer surface comprises a plurality of Teflon strips that enable relative movement of the flowline support frame and the annular member.

10. The coupling of claim 6, further comprising two plates connected to the first cylindrical member with the flowline support frame disposed therebetween and two pins extending from opposing sides of the flowline support frame, each pin having a third longitudinal centerline normal to the first and the second centerlines and received within a bore formed in one of the two plates, whereby the flowline support frame is rotatable about the third centerline relative to the first cylindrical member.

11. The coupling of claim 1, wherein the structure is one of an offshore platform and a base of a bottom tensioned riser, and wherein the flowline is one of a riser and a jumper.

12. A coupling between a flowline and a structure, the coupling comprising:
- a housing with a central portion having a throughbore and two tubular portions, each tubular portion extending normally from the central portion and having a first longitudinal centerline;
- a first cylindrical member disposed within one tubular portion and a second cylindrical member disposed within the other tubular portion, the first and second cylindrical members immovable relative to the structure, wherein the housing is rotatable about the first centerline relative to the structure; and
- a flowline support frame supporting the flowline and disposed within the throughbore, the flowline support frame supported by two pins extending therefrom, each pin received within a bore in the central portion and having a second longitudinal centerline normal to the first centerline, whereby the flowline support frame is rotatable about the second centerline relative to the housing, whereby the flowline is rotatable about the second centerline relative to the housing.

13. The coupling of claim 12, further comprising a coupling support frame coupled between the structure and each of the first and the second cylindrical members.

14. The coupling of claim 13, wherein the coupling support frame comprises a first plate connected between the structure and the first cylindrical member and a second plate connected between the structure and the second cylindrical member.

15. The coupling of claim 14, wherein the coupling support frame further comprises a first curved plate connected to the first plate and the structure and a second curved plate connected to the second plate and the structure.

16. The coupling of claim 12, wherein the flowline support frame has a throughbore extending therethrough and is coupled to an annular member disposed about the flowline and received within the throughbore.

17. The coupling of claim 16, wherein the flowline support frame comprises a ball grab connection releasably coupling the annular member.

18. The coupling of claim 16, wherein the flowline support frame has a third longitudinal centerline normal to the first and the second centerlines and wherein at least one of an inner surface of the flowline support frame bounding the throughbore and an outer surface of the annular member is a low friction surface enabling rotation of the flowline about the third centerline relative to the flowline support frame.

19. The coupling of claim 18, wherein at least one of the inner surface and the outer surface comprises a plurality of Teflon strips that enable relative movement of the flowline support frame and the annular member.

20. The coupling of claim 12, wherein the structure is an offshore platform, and wherein the flowline is a riser.

21. A method for coupling a flowline to a structure, the method comprising:
- disposing two cylindrical members within opposing ends of a housing, the cylindrical members having a first longitudinal centerline and immovable relative to the structure and the housing rotatable about the first centerline relative the cylindrical members; and
- coupling the flowline to the housing, whereby the flowline is rotatable relative to the housing about a second axis normal to the first centerline;
- inserting a third cylindrical member within the housing, the third cylindrical member rotatable about the second axis relative to the housing; and
- coupling the flowline to the third cylinfrical member;
- wherein the flowline is further rotatable relative to the housing about a third axis normal to the first centerline and the second axis;
- coupling a flowline support frame to the housing, the flowline support frame having a throughbore within which the flowline is received;
- inserting an annular member disposed about the flowline into the throughbore; and
- coupling the annular member and the flowline support frame.

22. The method of claim 21, wherein the coupling of the flowline support frame to the housing comprises extending two pins disposed on opposite sides of the flowline support frame into bores in the housing, whereby the flowline support frame and flowline supported therein are rotatable about the third axis.

23. The method of claim 21, wherein the coupling of the annular member and the flowline support frame comprises forming a low friction surface over one of an outer surface of the annular member and an inner surface of the flowline support frame bounding the throughbore, whereby the flowline is rotatable about the third axis relative to the flowline support frame and the housing coupled thereto.

24. The method of claim 23, wherein the forming a low friction surface comprises coupling a plurality of Teflon strips to one of the inner surface and the outer surface.

25. A method for coupling a flowline to a structure, the method comprising:
- disposing two cylindrical members within opposing ends of a housing, the cylindrical members having a first longitudinal centerline and immovable relative to the structure and the housing rotatable about the first centerline relative the cylindrical members; and
- coupling the flowline to the housing, whereby the flowline is rotatable relative to the housing about a second axis normal to the first centerline;
- inserting a third cylindrical member within the housing, the third cylindrical member rotatable about the second axis relative to the housing;
- coupling the flowline to the third cylindrical member;
- disposing a flowline support frame within the housing, the flowline support frame having a throughbore within which the flowline is received;
- inserting an annular member disposed about the flowline into the throughbore; and
- coupling the annular member and the flowline support frame.

26. The method of claim 25, wherein the coupling of the flowline support frame to the housing comprises extending two pins disposed on opposite sides of the flowline support frame into bores in the housing, whereby the flowline support frame and flowline supported therein are rotatable about a third axis normal to the first centerline and the second axis.

27. The method of claim 26, wherein the coupling of the annular member and the flowline support frame comprises forming a low friction surface over one of an outer surface of the annular member and an inner surface of the flowline support frame bounding the throughbore, whereby the flowline is rotatable relative to the flowline support frame and the housing about a third axis normal to the first centerline and the second axis.

28. The method of claim 27, wherein the forming a low friction surface comprises coupling a plurality of Teflon strips to one of the inner surface and the outer surface.

* * * * *